No. 621,485. Patented Mar. 21, 1899.
K. BULAND.
THILL COUPLING.
(Application filed Feb. 7, 1899.)
(No Model.)
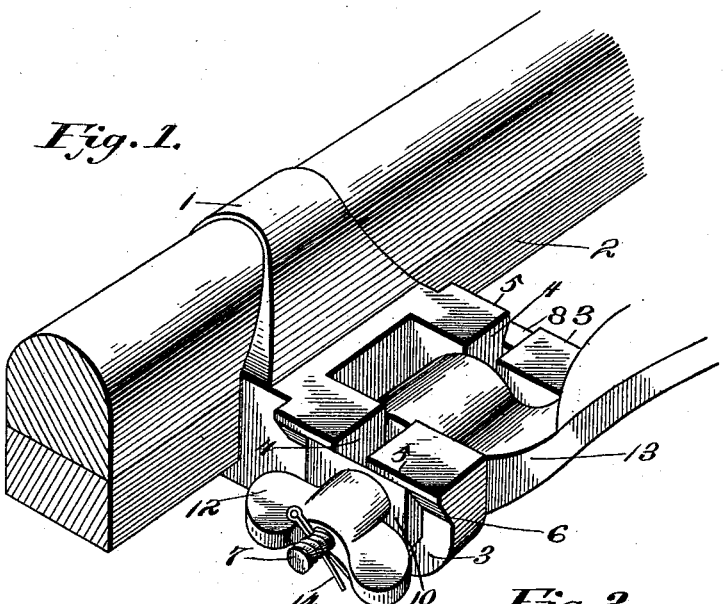
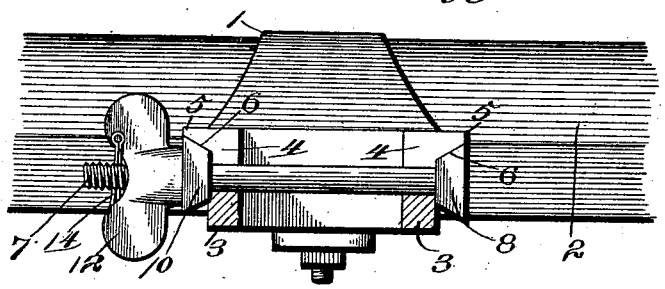
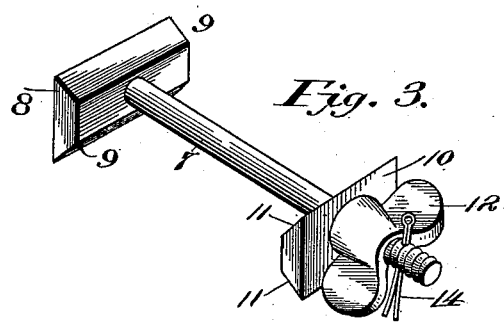
Witnesses
Clarence W. Walker
W. P. Shepard
Knut Buland, Inventor
By his Attorneys,
C. A. Snow & Co.
THE NORRIS PETERS CO., PHOTO-LITHO., WASHINGTON, D. C.

UNITED STATES PATENT OFFICE.

KNUT BULAND, OF LINN GROVE, IOWA.

THILL-COUPLING.

SPECIFICATION forming part of Letters Patent No. 621,485, dated March 21, 1899.

Application filed February 7, 1899. Serial No. 704,813. (No model.)

*To all whom it may concern:*

Be it known that I, KNUT BULAND, a citizen of the United States, residing at Linn Grove, in the county of Buena Vista and State of Iowa, have invented a new and useful Thill-Coupling, of which the following is a specification.

This invention relates to thill-couplings; and the object thereof is to provide improved means whereby the bolt may be tightly held against rattling and also permit of the same being removed to substitute a pole for the thills, or vice versa.

To these ends the present invention consists in the combination and arrangement of parts, as will be hereinafter more fully described, shown in the accompanying drawings, and particularly pointed out in the appended claims.

In the drawings, Figure 1 is a perspective view of the device. Fig. 2 is a transverse sectional view thereof. Fig. 3 is a detail perspective view of the bolt.

Like numerals of reference denote like and corresponding parts in each of the several figures of the drawings.

Referring to the accompanying drawings, 1 designates an axle-clip fitted to an axle 2 in the ordinary manner and provided with spaced ears 3. Each of the ears is provided with a slot 4, open at the top thereof, and the slots are alined transversely across the ears. Outwardly-extending flanges 5 are provided at opposite sides of each slot, flush with the upper faces of the ears and inclined or beveled inwardly and downwardly, as at 6, from the outer edges of the flanges to the sides of the ears.

As illustrated in Fig. 3, the coupling-bolt 7 has at one end a fixed transverse head 8, which is beveled, as at 9, upon its upper and lower faces convergently from the outer side toward the bolt. A loose oblong washer 10 is slidably fitted upon the other end of the bolt and is provided with beveled upper and lower faces 11, which are disposed oppositely to those of the head 8. A suitable nut 12 is provided upon the bolt outside of the washer.

To assemble the coupling, the nut and washer are removed from the bolt, and the latter is placed in the eye of the thill-iron 13. The bolt is then fitted in the slots 4 of the ears 3, through the upper open end thereof, and then the washer and nut are fitted to the end of the bolt, which projects beyond one of the ears. When the bolt is thus seated in the slots of the ears, the head 8 and washer 10 are below the flanges 5, and by tightening up on the nut the beveled faces of the head and washer are drawn tightly against the beveled faces of the respective flanges 5 and a binding fit is had therebetween. The engagement of the washer and head with the flanges of the ears prevents the bolt from being jolted upward, and the fixed head prevents the bolt from turning in the slots. To guard against the nut from being accidentally loosened by the movement of the vehicle and the thills, a suitable key 14 is fitted through the outer end of the bolt against the nut.

The present construction and arrangement provide but few parts, all of which are positively and substantially connected together, whereby rattling of the bolt and loss of any of the parts are prevented and the thills may be readily removed when desired.

Changes in the form, proportion, size, and the minor details of construction within the scope of the appended claims may be resorted to without departing from the spirit or sacrificing any of the advantages of this invention.

Having thus described the invention, what I claim is—

1. A thill-coupling, comprising an axle-clip having opposite spaced ears which are provided with alined slots and outwardly-extending flanges, and a coupling-bolt having a fixed head at one end, a washer slidable upon the other end of the bolt, and means for adjusting the washer thereon, the bolt being adapted to be fitted in the eye of a thill-iron and in the slots of the ears, whereby the head and the washer may be engaged with the flanges of the ears and retain the bolt in place, substantially as shown and described.

2. A thill-coupling, comprising an axle-clip having opposite spaced ears, each ear having an outwardly-extending beveled or undercut flange, and a transverse vertical slot formed therein, and a bolt having a fixed beveled head, a beveled washer slidable upon the bolt, and a nut for adjusting the washer, the bolt being adapted to be fitted in the eye of the thill-iron, and in the slots of the ears, whereby the beveled faces of the head and washer may be engaged with the respective beveled flanges of the ears, substantially as and for the purpose set forth.

3. In a thill-coupling, the combination of an axle-clip having opposite spaced ears, each ear being provided with a vertical transverse slot open at its upper end, and outwardly-extending flanges flush with the upper face of the ear, undercut or beveled inwardly and downwardly and disposed at opposite sides of the slot, and a coupling-bolt having a fixed transverse head convergently beveled toward the bolt upon its upper and lower faces, an oblong washer slidably fitted upon the bolt having its upper and lower faces beveled oppositely to those of the head, and a nut arranged upon the bolt outside of the washer, the bolt being adapted to be fitted in the eye of the thill-iron and in the slots of the ears, and the nut being adapted to clamp the beveled faces of the head and washer against the beveled faces of the respective flanges, substantially as shown and described.

In testimony that I claim the foregoing as my own I have hereto affixed my signature in the presence of two witnesses.

KNUT BULAND.

Witnesses:
   C. L. WARD,
   W. GLEASON.